(12) United States Patent
Rydström et al.

(10) Patent No.: US 10,547,355 B2
(45) Date of Patent: Jan. 28, 2020

(54) ROTATABLE ANTENNA ARRANGEMENT FOR LOS-MIMO

(71) Applicant: Telefonaktiebolaget LM Ericsson (publ), Stockholm (SE)

(72) Inventors: Mats Rydström, Billdal (SE); Lei Bao, Göteborg (SE); Thomas Emanuelsson, Västra Frölunda (SE); Per Ligander, Göteborg (SE); Bengt-Erik Olsson, Mountain Lakes, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/088,647

(22) PCT Filed: Mar. 29, 2016

(86) PCT No.: PCT/EP2016/056757
§ 371 (c)(1),
(2) Date: Sep. 26, 2018

(87) PCT Pub. No.: WO2017/167352
PCT Pub. Date: Oct. 5, 2017

(65) Prior Publication Data
US 2019/0115957 A1    Apr. 18, 2019

(51) Int. Cl.
*H04B 7/0413*   (2017.01)
*H01Q 1/12*   (2006.01)
*H01Q 3/04*   (2006.01)

(52) U.S. Cl.
CPC .......... *H04B 7/0413* (2013.01); *H01Q 1/125* (2013.01); *H01Q 3/04* (2013.01)

(58) Field of Classification Search
CPC .......... H04B 7/0413; H01Q 3/04; H01Q 3/12; H01Q 3/02; H01Q 1/125
See application file for complete search history.

(56) References Cited

U.S. PATENT DOCUMENTS 2,644,158 A        6/1953   Thrift
2012/0176608 A1*   7/2012   McCown ............. H01Q 1/1264
                                              356/138
(Continued)

FOREIGN PATENT DOCUMENTS

EP       1150379 A1      10/2001
WO    WO 01/52447 A2     7/2001
(Continued)

OTHER PUBLICATIONS

International Search Report and Written Opinion of the International Searching Authority, PCT/EP2016/056757, dated Dec. 21, 2016, 9 pages.

*Primary Examiner* — Dac V Ha
(74) *Attorney, Agent, or Firm* — Sage Patent Group

(57) ABSTRACT

An antenna arrangement for LOS-MIMO communication, comprising first and second directive antenna units, a mounting bracket, and a connecting element attached to at least one of the directive antenna units and arranged to separate the directive antenna units by a distance. The connecting element is rotatably arranged in relation to the mounting bracket, wherein a rotation of the connecting element about the rotation axis changes an effective distance d between the first and the second directive antenna units.

20 Claims, 16 Drawing Sheets

(56) References Cited

U.S. PATENT DOCUMENTS

| | | | | |
|---|---|---|---|---|
| 2017/0237456 A1* | 8/2017 | Shaker | ................... | H01Q 1/125 |
| | | | | 455/65 |
| 2018/0213417 A1* | 7/2018 | Lysejko | ................ | F16M 11/06 |
| 2018/0375187 A1* | 12/2018 | Rao | ...................... | H01Q 1/1257 |
| 2019/0028154 A1* | 1/2019 | Yamada | ............... | H04B 7/0413 |

FOREIGN PATENT DOCUMENTS

| WO | WO 2013/097888 A1 | 7/2013 |
|---|---|---|
| WO | WO 2016/128061 A1 | 8/2016 |

* cited by examiner

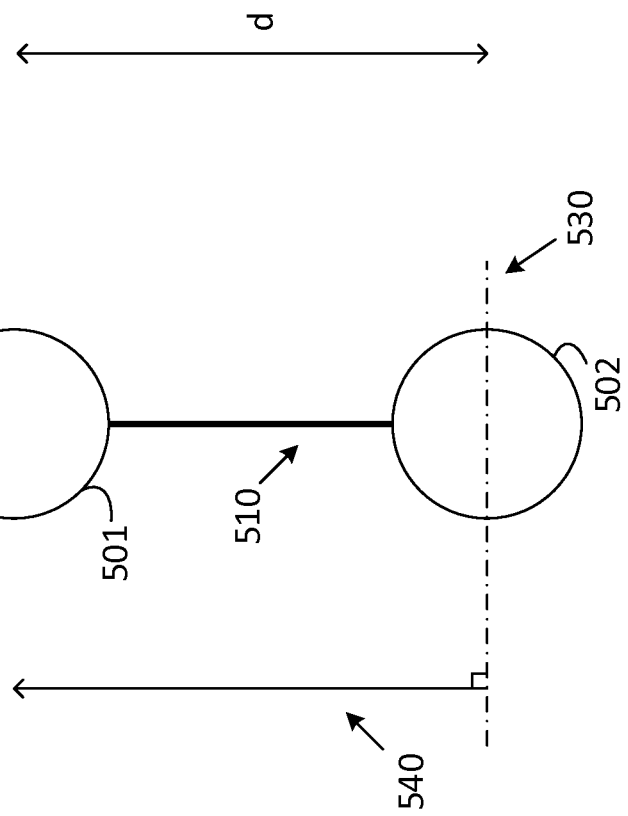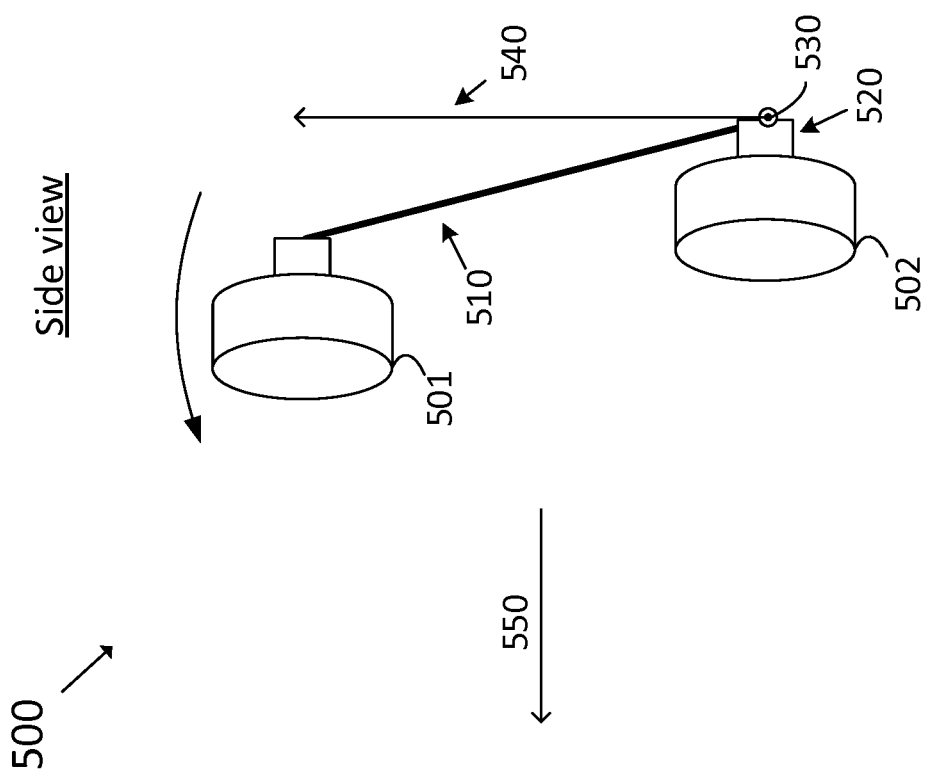
Fig 5b
Fig 5a

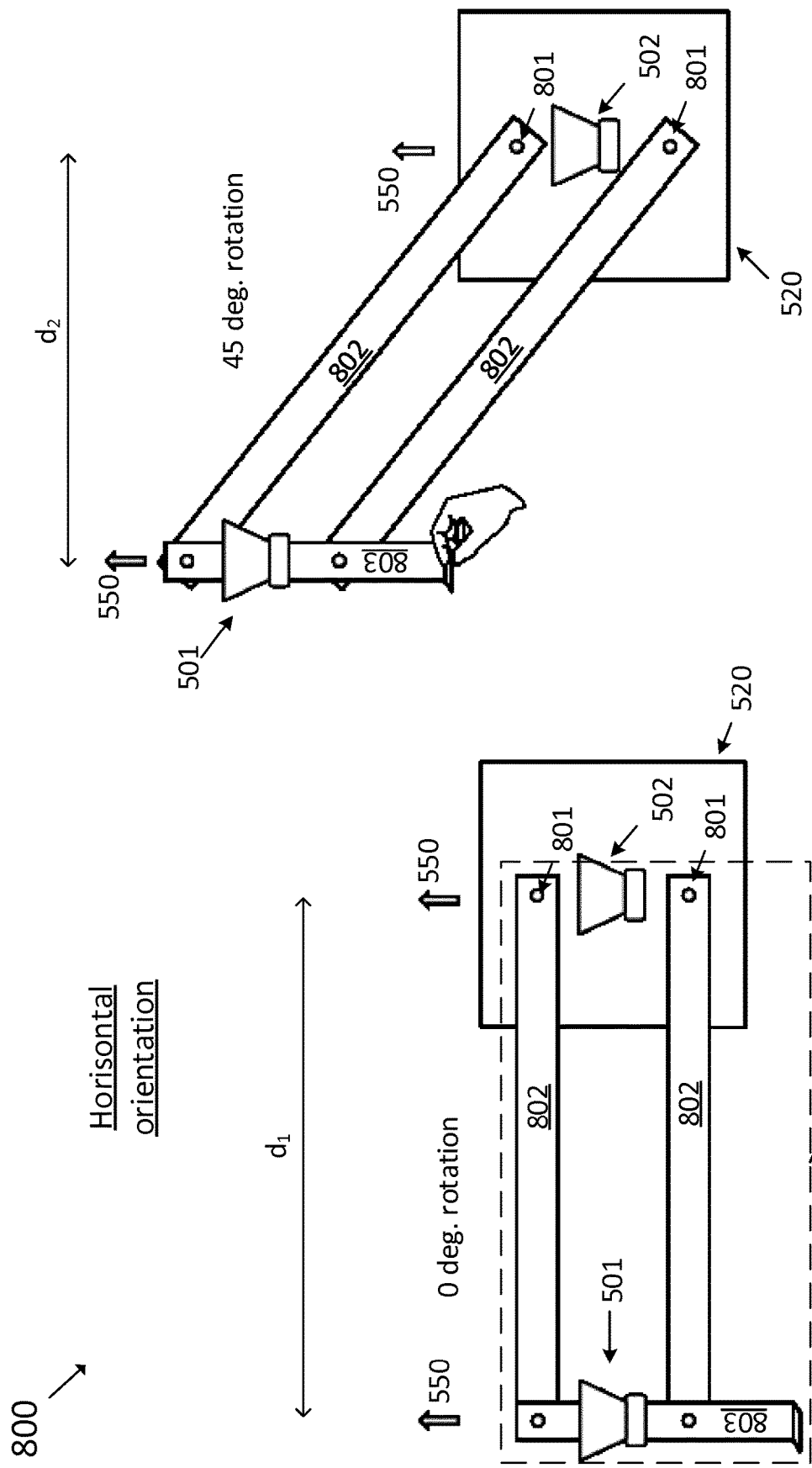

ROTATABLE ANTENNA ARRANGEMENT FOR LOS-MIMO

CROSS REFERENCE TO RELATED APPLICATIONS

This application is a 35 U.S.C. § 371 national stage application of PCT International Application No. PCT/EP2016/056757 filed on Mar. 29, 2016 the disclosure and content of which is incorporated by reference herein in its entirety.

TECHNICAL FIELD

The present disclosure relates to wireless communication systems, and in particular to point-to-point radio links.

BACKGROUND

A point-to-point radio link is a communication system for transmission of data between two fixed locations, or sites, over a point-to-point link. Point-to-point radio links often operate at microwave carrier frequency, i.e., in the GHz range. A radio link transmitter and receiver are often incorporated into one unit, herein denoted as transceiver. Radio links often use directive antennas in order to improve communication conditions. Such directive antennas must be carefully aligned with respect to a corresponding antenna at the other side of the radio link in order to provide maximum system gain. Radio link antenna deployment therefore takes time and often requires skilled personnel in order to properly deploy antennas.

Directive antennas, including mounting brackets for attaching antennas to fixed infrastructure, must often be assembled from a kit of parts on-site, and then carried manually or lifted high above ground before reaching the deployment point. Parts may get lost in the process, causing further delays.

FIG. 1 illustrates a radio link system implementing line-of-sight (LOS) multiple-input multiple-output (MIMO) communication according to prior art. A first MIMO transceiver TRX A communicates 110 with a second MIMO transceiver TRX B, at a carrier frequency f, via a first 101 and a second 102 antenna spaced apart by distance $d_1$. The second MIMO transceiver TRX B uses two antennas spaced apart by distance $d_2$. A LOS-MIMO system provides increased system spectral efficiency compared to single-input single-output (SISO) systems, in terms of bits/sec/Hz. However, in order for a LOS-MIMO system to be fully functional, the inter-antenna distances $d_1$ and $d_2$ must be carefully configured as a function of radio link length L and carrier frequency f.

LOS-MIMO antenna deployment presents an even bigger challenge than conventional radio link antenna deployment, since LOS-MIMO requires a plurality of antennas, which antennas must be located at certain relative positions to each other. FIGS. 2a and 2b illustrate examples of LOS-MIMO antenna deployments. It is often difficult to adjust inter-antenna distances, e.g., by adjusting location of mounting brackets 230 when antennas are deployed high up in a mast 210, such as illustrated in FIG. 2a, or on a building wall or roof-top 260, such as illustrated in FIG. 2b.

WO/2013/097888 relates to a LOS-MIMO system which offers simplified antenna deployment. Here two antennas are arranged on a shared mounting bracket and adjustably in relation to each other such that the inter-antenna distance can be adjusted without adjusting the position of the mounting bracket. Thus, LOS-MIMO antennas need only be attached to the mast or building once, and then the mounting bracket need not be moved during inter-antenna distance adjustment. This arrangement comprises a number of moving parts and is thus associated with some additional manufacturing cost.

SUMMARY

An object of the present disclosure is to provide an antenna arrangement for line-of-sight (LOS) multiple-input multiple-output (MIMO) communication which enables simplified high precision antenna deployment for LOS-MIMO communication systems, and which can be produced at low cost. A further object of the present disclosure is to provide methods which enable simplified deployment of antenna arrangements for LOS-MIMO communication systems.

The object is obtained by an antenna arrangement for line-of-sight (LOS) multiple-input multiple-output (MIMO) communication, comprising first and second directive antenna units arranged to have antenna main lobes pointing in a transceiving direction, a mounting bracket for mounting the antenna arrangement to a fixed infrastructure, and a connecting element attached to at least one of the directive antenna units and arranged to separate the directive antenna units by a distance. The connecting element is rotatably arranged in relation to the mounting bracket and arranged to rotate about a rotation axis.

Hereby a single mounting bracket is used to mount all LOS-MIMO antennas of a LOS-MIMO transceiver, providing for simplified antenna deployment.

The rotation of the connecting element about the rotation axis changes an effective distance d between the first and the second directive antenna units. The effective distance d, or effective inter-antenna distance d, is herein measured as a distance between positions of the first and the second directive antenna units projected onto a first axis perpendicular to the rotation axis. The effective distance is, according to aspects, measured in meters.

Adjustment of effective inter-antenna distance is effected via rotation of the connecting element, not by adjusting positions of antenna units of a transceiver in relation to each other. This way, adjustment of effective inter-antenna distance is achieved without moving antennas of a MIMO transceiver in relation to each other, which in turns allows for an antenna arrangement with a reduced number of moving parts.

According to aspects, the connecting element is arranged to rotate about the rotation axis in a plane perpendicular to the transceiving direction.

This allows for deployment of the antenna arrangement at locations where a rotation in a plane parallel to the transceiving direction is, for some reason, not preferred.

According to aspects, the connecting element is directly attached to the mounting bracket, and the rotation axis passes through the mounting bracket.

Thus, by integrating the rotation function in the mounting bracket, the number of parts in the antenna arrangement is further reduced.

According to aspects, the connecting element is arranged to rotate about the rotation axis in a plane parallel to the transceiving direction.

This allows for deployment of the antenna arrangement at locations where a rotation about the rotation axis in a plane perpendicular to the transceiving direction is, for some reason, not preferred.

According to aspects, the connecting element comprises a pantograph arrangement, the pantograph arrangement being configured to maintain the transceiving direction of the directive antennas independently of connecting element rotation about the rotation axis.

The pantograph arrangement provides automatic adjustment of transceiving direction, which automates re-alignment of transceiving direction where such re-alignment is necessary. Thus, antenna deployment is further simplified, especially in configurations involving rotation of the connecting element in a plane parallel to the transceiving direction.

According to aspects, the antenna arrangement comprises a scale arranged to indicate a present angle of rotation of the connecting element.

This way, a field-technician can more easily determine a present angle of rotation of the connecting element.

According to aspects, said scale is arranged to indicate a preferred level of rotation as function of radio link length L and radio link carrier frequency f.

This way, a field-technician can more easily determine a preferred rotation of the connecting element and configure the connecting element accordingly, providing for further simplification of the antenna deployment.

According to aspects, the connecting element is configured to be manually rotated about the rotation axis.

This way, a field-technician can rotate the connecting element even if there is no electrical power or other means for automatic rotation of the connecting element available on-site.

According to aspects, the connecting element is configured to be automatically rotated about the rotation axis in response to an input control signal.

This way, a field-technician can supply an input signal to rotate the connecting element, potentially from a remote location, which simplifies rotation of the connecting element.

The further object is obtained by a method for deployment of an antenna arrangement according to the present teaching, comprising attaching the antenna arrangement to a fixed infrastructure at a near end of a planned radio link, by means of the one or more mounting brackets, and determining a preferred effective distance between first and second directive antennas, and also rotating the connecting element of the antenna arrangement to obtain the preferred effective distance between the first and the second directive antenna.

This method simplifies deployment of LOS-MIMO antenna arrangements. A field technician does not have to adjust location of mounting brackets after mounting, but can instead rotate the connecting element to obtain different effective inter-antenna distances.

The further object is also obtained by a method for deployment of an antenna arrangement according to the present teaching, comprising configuring an alignment signal transmission device on a far side of a planned radio link, for transmission of an alignment signal, attaching the antenna arrangement to a fixed infrastructure at a near end of the planned radio link, by means of the one or more mounting brackets, receiving the alignment signal by the antenna arrangement, measuring a signal quality of the received signal, and also rotating the connecting element of the antenna arrangement to improve the measured signal quality of the received signal.

This method simplifies deployment of LOS-MIMO antenna arrangements. A field technician does not have to determine a preferred effective inter-antenna distance prior to deployment, and thus does not need information about, e.g., radio link length and carrier frequency. Instead, the field technician simply rotates the connecting element until the signal quality is good enough. The rotation of connecting element is an optimization of received signal quality.

The further object is also obtained by a method for deployment of an antenna arrangement according to the present teaching, comprising configuring an alignment signal reception device on a far side of a planned radio link, for reception of an alignment signal, attaching the antenna arrangement to a fixed infrastructure at a near end of the planned radio link, by means of the one or more mounting brackets, transmitting an alignment signal by the antenna arrangement to the alignment signal reception device, measuring a signal quality of the alignment signal received by the alignment signal reception device, and rotating the connecting element of the antenna arrangement to improve the measured signal quality of the received signal.

This method simplifies deployment of LOS-MIMO antenna arrangements. A field technician does not have to determine a preferred effective inter-antenna distance prior to deployment, and thus does not need information about, e.g., radio link length and carrier frequency.

Instead, the field technician simply rotates the connecting element until the signal quality is good enough. The rotation of connecting element is an optimization of received signal quality.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIGS. 3-11 illustrate aspects of antenna arrangements disclosed herein.

DETAILED DESCRIPTION

Figure 1:
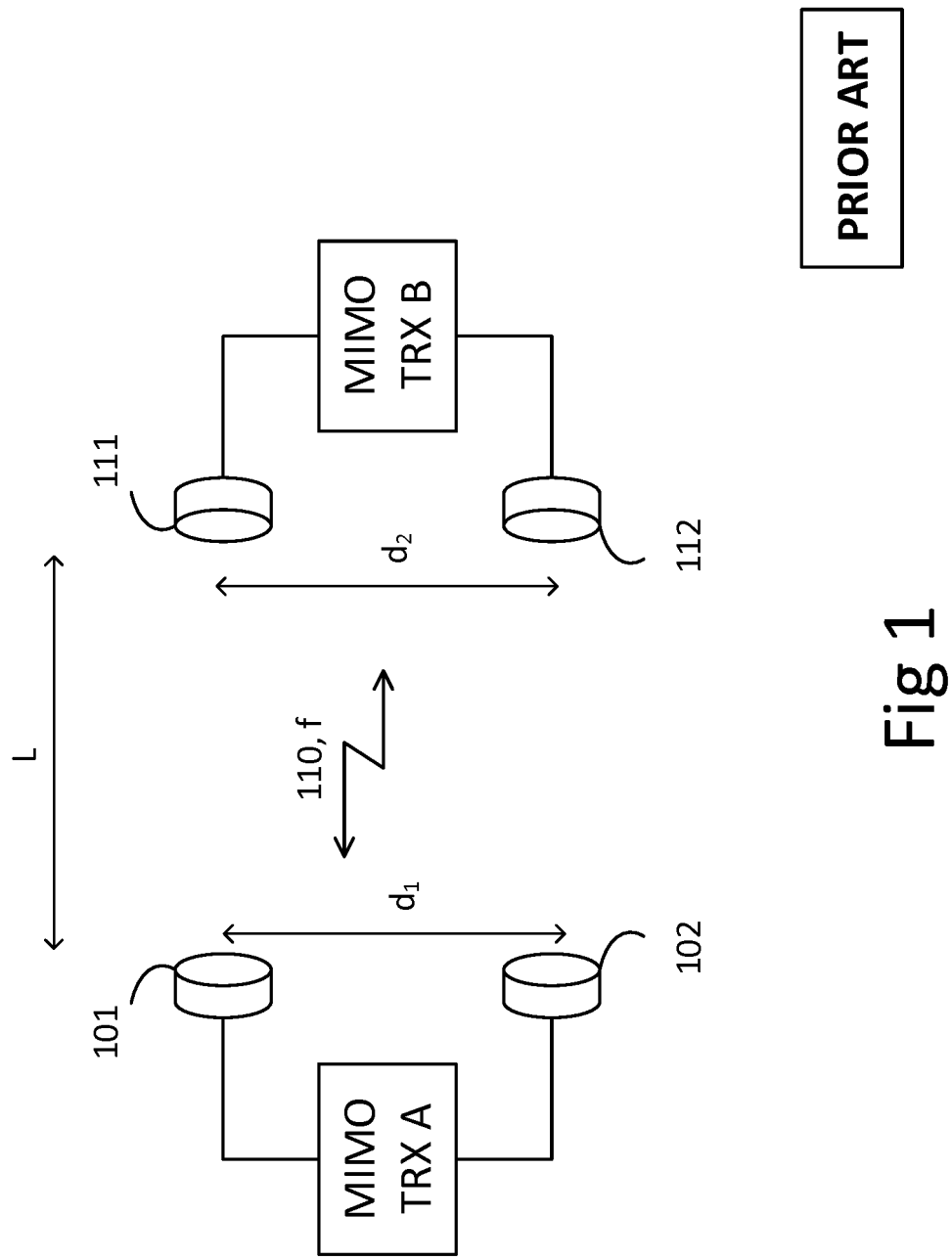
FIG. 1 is a block diagram illustrating a point-to-point LOS-MIMO radio link according to prior art.

Multiple-input multiple-output (MIMO) radio communication exploits a plurality of transmit and receive antennas in order to increase communication throughput. The success of MIMO communication is known to depend on the characteristics of the propagation channel between transmitter antennas and receiver antennas. In particular, MIMO communication is only possible if the propagation channel between transmitting antennas and receiving antennas is invertible with sufficient precision. When the propagation channel is modelled by a matrix H, this means that the eigenvalues of the matrix H need to be sufficiently large.

Normally, such invertible propagation channels are obtained by means of multipath propagation between transmitter and receiver stations, i.e., from the fact that a transmitted signal propagates along multiple different propagation paths from each transmitter antenna to the receiving antennas.

Point-to-point radio links are often deployed in clear line-of-sight (LOS) conditions, i.e., there is a clear path directly from antennas at the transmitting station to antennas at the receiving station. Furthermore, highly directive antennas are often used, which means that there is a minimum of multipath propagation, due to that the main part of transmitted signal energy is directed at the receiving antenna, and thus cannot easily reflect of neighboring objects in the environment.

Due to the lack of multipath propagation, MIMO communication is not possible, unless antennas are deployed with a relative geometry so as to make eigenvalues of the propagation channel sufficiently large for MIMO communication. This means that antenna deployment becomes constrained to certain relative geometries, which complicate LOS-MIMO antenna deployment.

There are many ways to express this geometrical constraint on antenna position, for instance, for a two-by-two LOS-MIMO system, $$d_t d_r = \frac{\lambda L}{2}$$

where $d_t$ and $d_r$ are effective inter-antenna distances at transmitter and receiver, $\lambda$ is the carrier wavelength, L is the link distance.

It is important to note that it is not the actual antenna distances per se that matter in this formula, but projected antenna distances onto a common first axis. If there is relative rotation between symmetry axes of the two antenna sites, a different effective inter-antenna distance results. This concept is fundamental to the present teaching, and will be discussed in more detail in connection to FIGS. 7a and 7b.

The present teaching makes use of the fact that actual inter-antenna separation is different from effective inter-antenna distance. By arranging antenna units at a substantially fixed distance from each other but rotatably about a rotation axis, it is possible to control effective antenna distance by rotating the antenna units about the rotation axis. This rotation is easily performed by a field technician during antenna deployment, and does not add much to the manufacturing cost of the antenna arrangement. An advantage of the proposed antenna arrangements is that location of mounting brackets need not be adjusted once attached to fixed infrastructure.

A suitable inter-antenna distance can, by means of the disclosed antenna arrangement, be selected by rotating the antenna arrangement about a rotation axis. Each angle of rotation then results in a corresponding effective inter-antenna distance.

Figure 3:
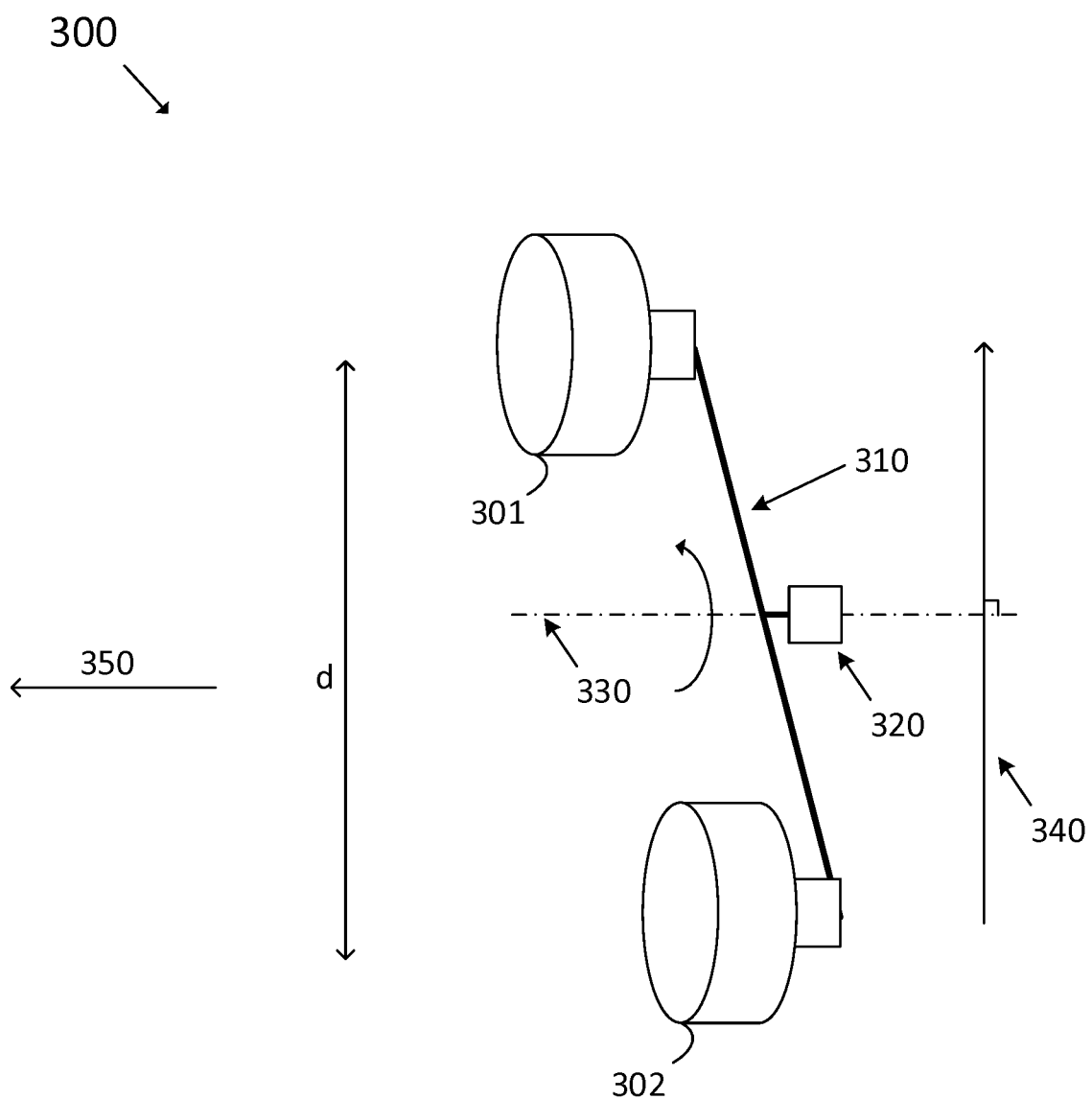

FIG. 3 illustrates an aspect of the disclosed antenna arrangement 300. The antenna arrangement is suitable for LOS-MIMO communication in that it comprises a plurality of antenna units which can be arranged at an adjustable inter-antenna effective distance.

Figure 2A:
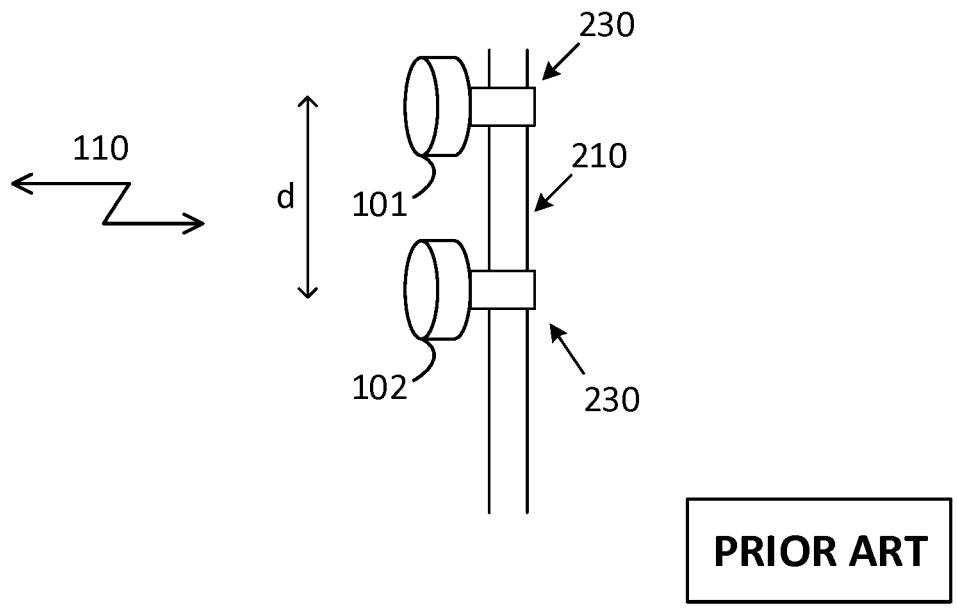
FIGS. 2a, 2b illustrate antenna deployment for LOS-MIMO communication according to prior art.
Figure 2B:
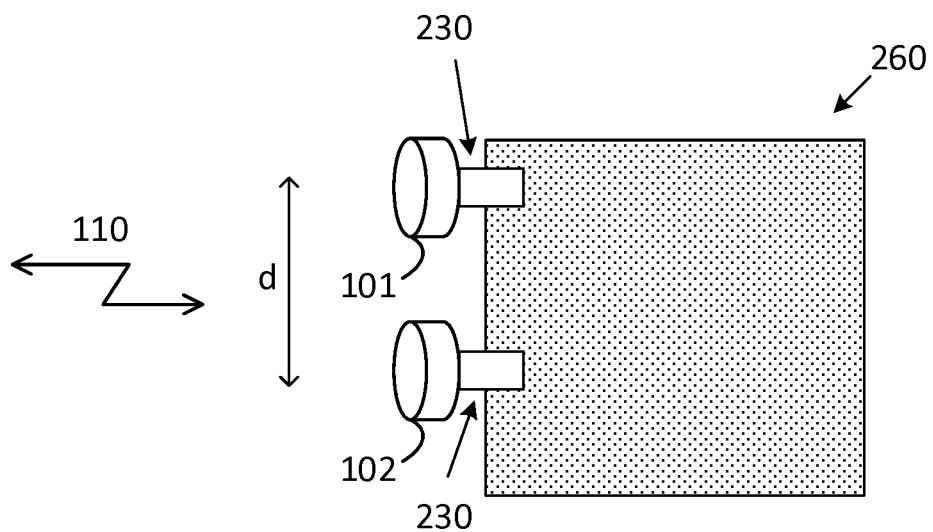

The antenna arrangement 300, comprises first 301 and second 302 directive antenna units arranged to have antenna main lobes pointing in a transceiving direction 350. There is a mounting bracket 320 for mounting the antenna arrangement to a fixed infrastructure, such as the mast 210 or the building 260 shown in FIGS. 2a and 2b. A connecting element 310 is attached to at least one of the directive antenna units and arranged to separate the directive antenna units by a distance. This connecting element is here shown attached to both antenna units, but need only be attached to one antenna unit as discussed below in connection to FIG. 6b and FIG. 13. The connecting element is rotatably arranged in relation to the mounting bracket and arranged to rotate about a rotation axis 330.

Thus, a rotation of the connecting element about the rotation axis changes an effective distance d between the first 301 and the second 302 directive antenna units. The effective distance d is measured as a distance between positions of the first and the second directive antenna units projected onto a first axis 340 perpendicular to the rotation axis 330. The effective distance d, or effective inter-antenna distance d, will be discussed in more detail in connection to FIG. 7 below. The effective distance is, according to aspects, measured in meters.

In FIG. 3, the connecting element 310 is arranged to rotate about the rotation axis 330 in a plane 730 perpendicular to the transceiving direction 350. This type of rotation is suitable for scenarios where no obstacles are present in said plane 730 perpendicular to the transceiving direction 350, such as when the antenna arrangement is deployed on a mast or when the transceiving direction of the directive antenna is perpendicular to a building wall or other structure to which the antenna arrangement is to be mounted.

It is appreciated that the transceiving direction is maintained during rotation of the connecting element 310, due to that the rotation is in a plane perpendicular to the transceiving direction.

Figure 4A:
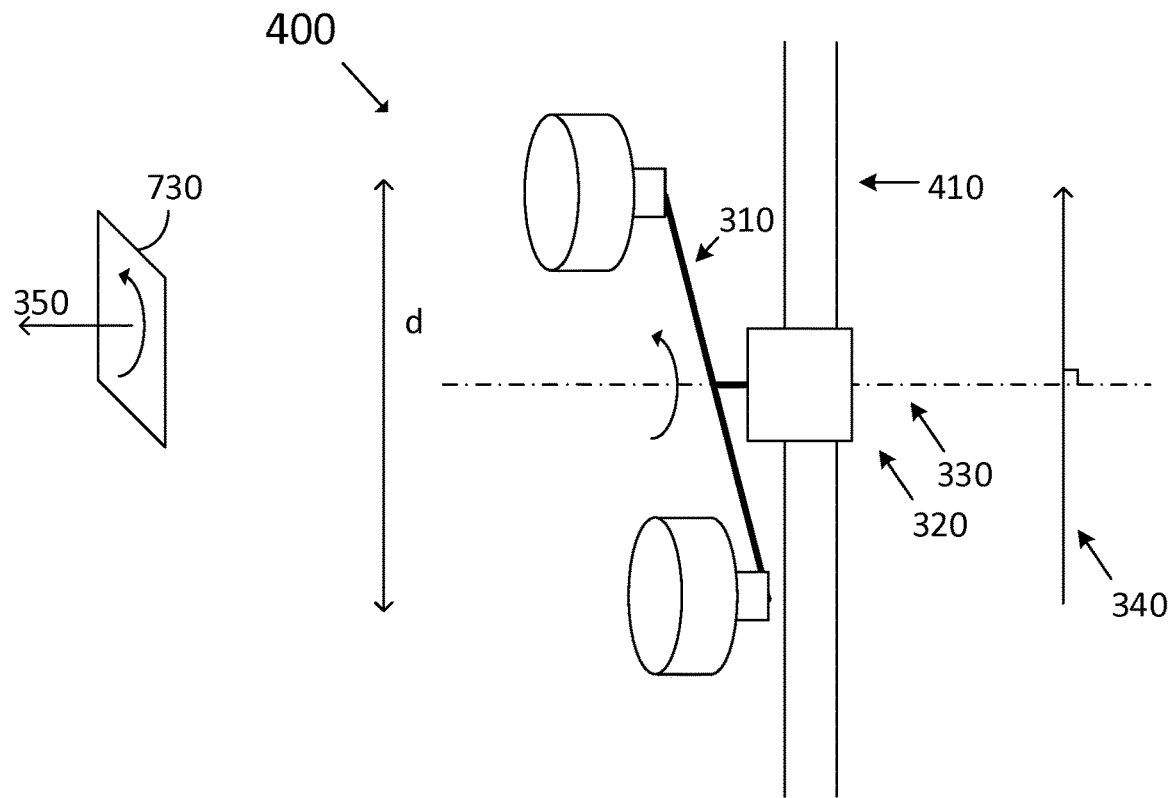
Figure 4B:
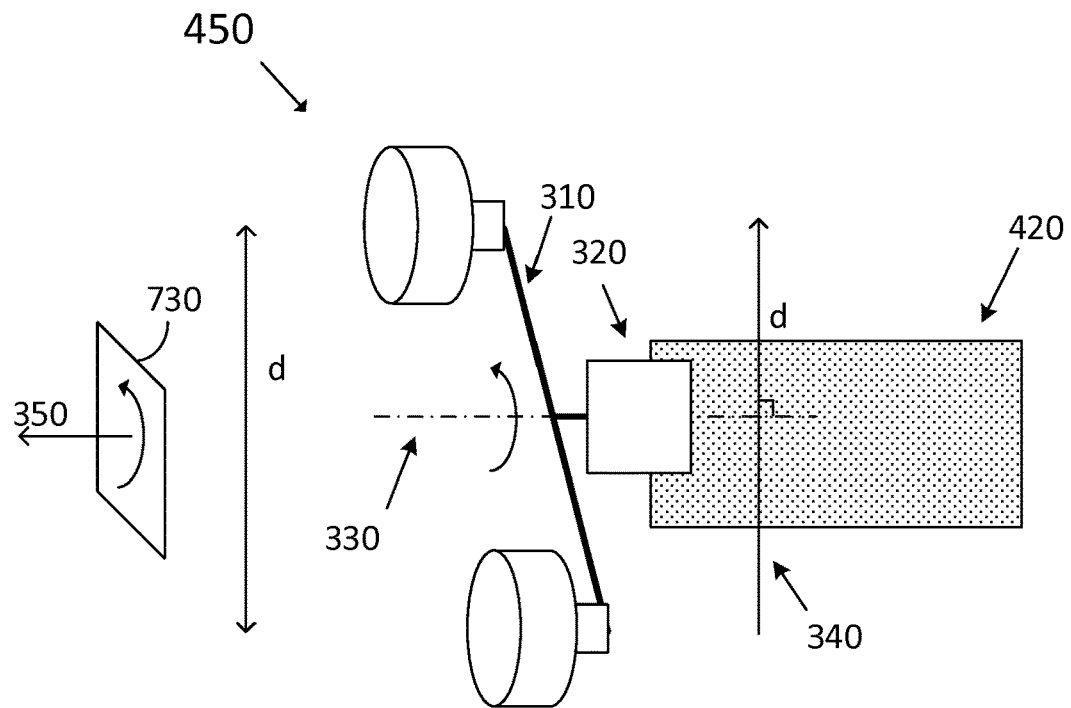

Some such scenarios are illustrated in FIGS. 4a and 4b. In FIG. 4a, the antenna arrangement 400 has been mounted onto a mast 410 by means of the mounting bracket 320. In FIG. 4b, the antenna arrangement 450 has been mounted onto a building or other structure 420 by means of the mounting bracket 320. In the examples of FIGS. 4a and 4b the connecting element 310 is arranged to rotate about the rotation axis 330 in a plane 730 perpendicular to the transceiving direction 350.

As the connecting element rotates about the rotation axis 330, the effective inter-antenna distance d changes. This way, the antenna arrangement 400, 450 can be adapted to a particular LOS-MIMO communication scenario, e.g., to a radio link far-end antenna geometry, a particular radio link distance L, and carrier frequency f, by setting a suitable angle of rotation of the connecting element.

The connecting element 310 can be directly attached to the mounting bracket 320, e.g., as illustrated in FIG. 3, and the rotation axis 330 then passes through the mounting bracket. According to some aspects, the connecting element is fitted with a tap configured to rotate in a corresponding hole or recess arranged in the mounting bracket.

It is also appreciated that polarization alignment of dual-polarized antennas is affected during rotation. Such polarization misalignment can be compensated for by digital signal processing, as disclosed in PCT/EP2015/053035.

FIGS. 3, 4a, and 4b show a connecting element 310 attached to first and second directive antenna unit. It is appreciated that the connecting element does not need to be attached to both antenna units. It is sufficient that the connecting element is attached to one of the antenna units. The second antenna unit can be mounted separately to the fixed infrastructure by means of a separate mounting bracket. This will be discussed in connection to FIG. 6b and FIG. 13 below.

FIG. 5 illustrates aspects of the antenna arrangement where the rotation of the connecting element 510 is in a different plane compared to examples in FIGS. 3, 4a, and 4b.

Here, the connecting element 510 is arranged to rotate about the rotation axis 530 in a plane parallel to the transceiving direction 550.

The same principles of LOS-MIMO as discussed above apply also here. As the connecting element is rotated about the rotation axis 530, the effective inter-antenna distance d changes. However, since the rotation is in a plane parallel to the transceiving direction, the transceiving direction of directive antennas will be affected by the rotation unless some countermeasures are applied.

Many different variants of said countermeasures are possible. The purpose of the countermeasure is to maintain a substantially fixed transceiving direction 550 of the directive antenna units independently of rotation of the connecting element about the rotation axis 530.

Arrangements involving gear arrangements, such as worm-gear arrangements, or gyro arrangements are possible options for maintaining a substantially constant transceiving direction 550 independently of connecting element rotation. Such arrangement may however add to manufacturing cost.

A preferred embodiment of the antenna arrangement configured to rotate about the rotation axis 530 in a plane parallel to the transceiving direction 550 comprises a pantograph arrangement. Such arrangements are discussed below in connection to FIG. 8 and FIG. 9.

According to some aspects, a dome or cover is arranged to enclose the directive antennas and the connecting element. Such dome or cover provides weather protection, and gives the antenna arrangement the same look and feel as a legacy reflector antenna arrangement.

The connecting element 310, 510 is, according to some aspects, configured to be manually rotated about the rotation axis 330, 530. This is a low cost alternative for providing a rotatable connecting element. A field technician then manually rotates the connecting element until a preferred effective inter-antenna distance is obtained.

The connecting element 310, 510 is, according to some further aspects, configured to be automatically rotated about the rotation axis 330, 530 in response to an input control signal.

According to aspects, this automatic rotation is achieved by means of a motor. An automatic rotation can be triggered by a field-technician on-site or remotely. I.e., the input control signal can be delivered to the antenna arrangement and said motor via, e.g., a push-button arranged in connection to the antenna arrangement or it can be delivered via, e.g., radio signal or over a cable connection from a remote location to the antenna arrangement.

According to some aspects the antenna arrangement 300, 500 comprises a locking mechanism having an open and a closed position. The locking mechanism is arranged to allow rotation of the connecting element when in the open position, and to prevent rotation of the connecting element when in the closed position. A field technician can use the locking mechanism to fix the state of the antenna arrangement once a preferred effective inter-antenna distance has been configured.

Figure 6A:
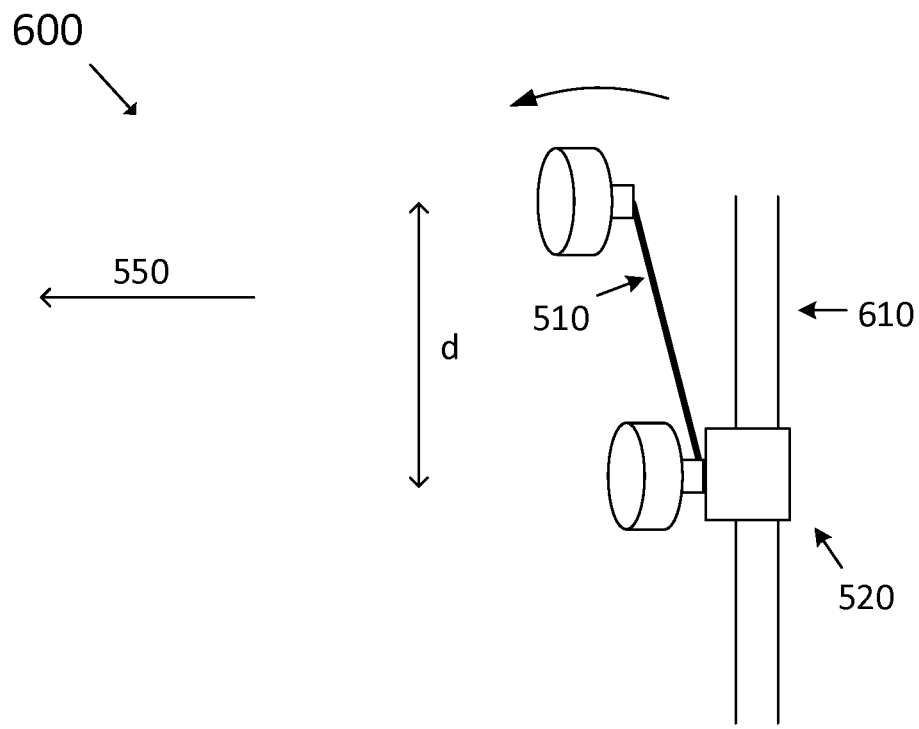

FIG. 6a illustrates an antenna arrangement 600 with a connecting element 510 arranged to rotate in a plane parallel to the transceiving direction 550. The antenna arrangement in FIG. 6a is mounted by means of the mounting bracket 520 to a mast 610.

Figure 6B:
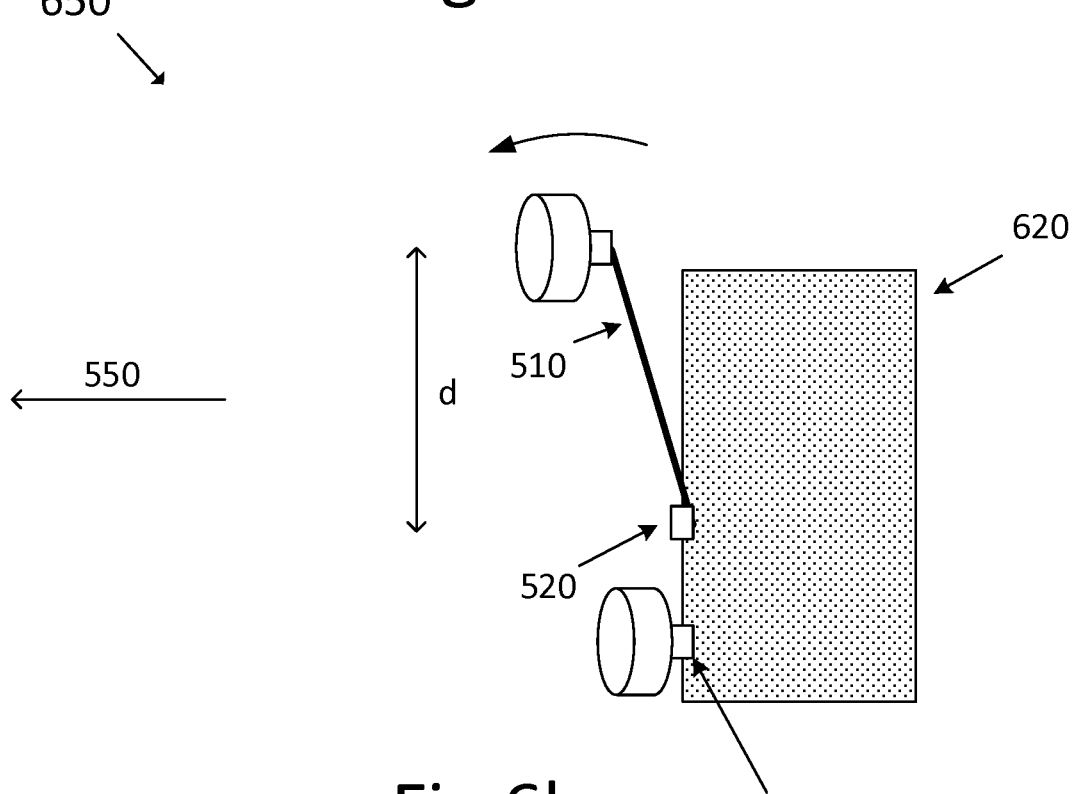

FIG. 6b also illustrates an antenna arrangement 650 with a connecting element 510 arranged to rotate in a plane parallel to the transceiving direction 550. The antenna arrangement in FIG. 6b is mounted by means of the mounting bracket 520 to a building or other fixed infrastructure 620.

It is noted that the connecting element shown in FIG. 6b is only attached to one of the directive antenna units. The other directive antenna unit is attached to the fixed infrastructure by means of a separate mounting bracket 660. This type of configuration, i.e., when only one of the directive antenna units is attached to the connecting element, and the other directive antenna unit is mounted by means of a separate mounting bracket is applicable also in previous examples, in particular in the examples illustrates in FIG. 3, FIGS. 4a and 4b, FIGS. 5a and 5b, as well as FIGS. 8a, 8b, 9a, and 9b.

Figure 13:
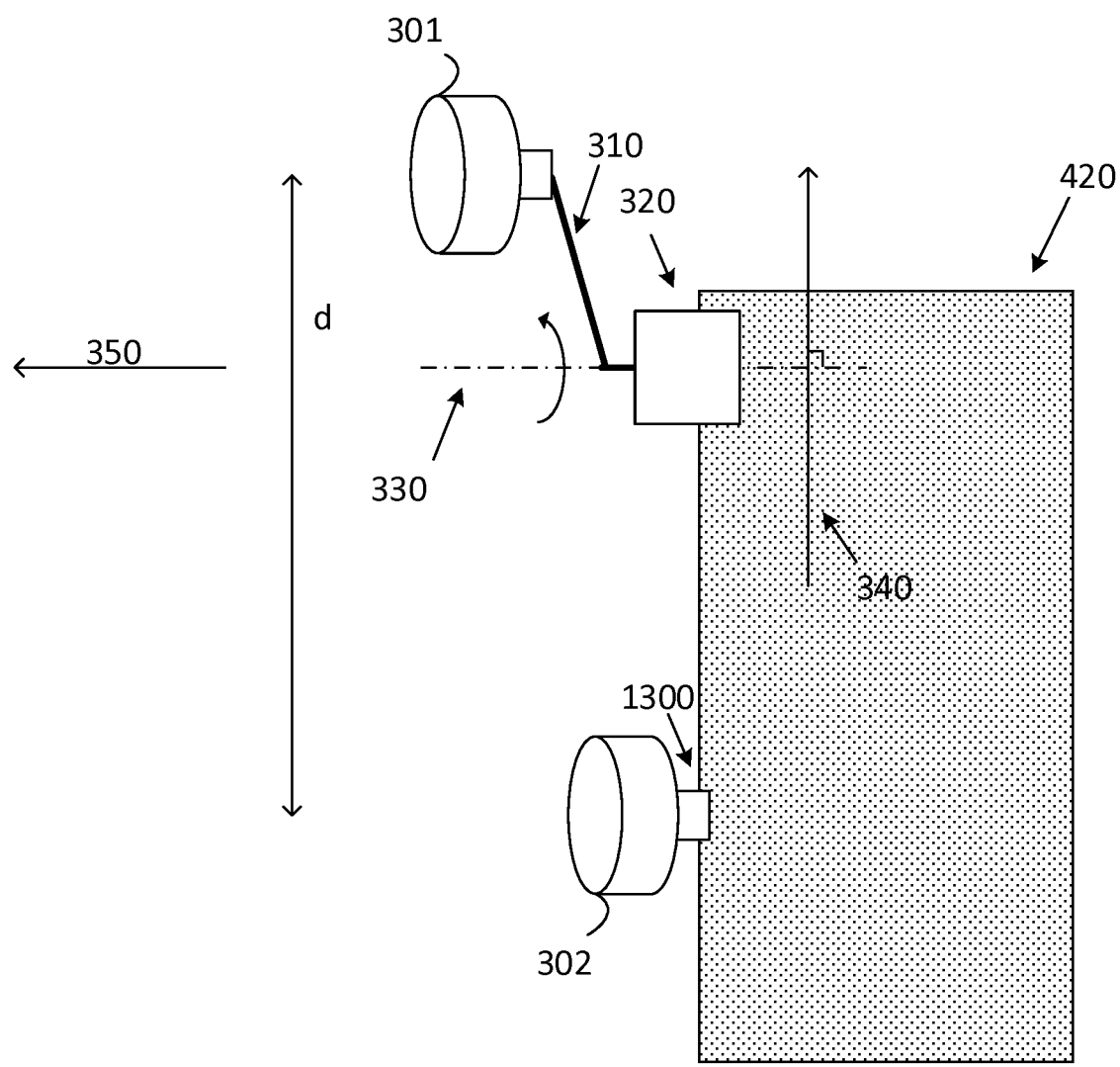
FIG. 13 illustrates aspects of antenna arrangements disclosed herein.

An example of where the connecting element is attached to the first directive antenna unit and not to the second directive antenna unit is illustrated in FIG. 13 where a further mounting bracket 1300 is used to attach the second directive antenna unit 302 to the fixed infrastructure. The same principles of effective antenna distance as discussed above still apply, i.e., a rotation of the connecting element about the rotation axis 330 causes a change in effective inter-antenna distance d.

Figure 7A:
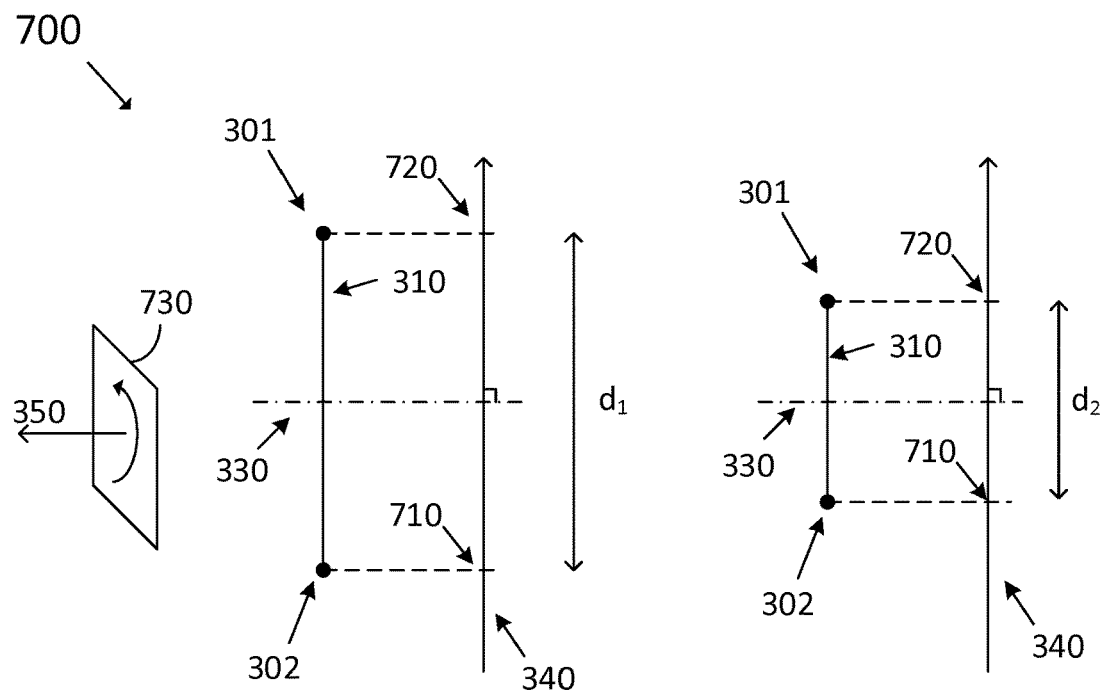

FIG. 7a illustrates aspects of how the effective antenna distance d is determined, and also illustrates that effective inter-antenna distance is upper-bounded by the physical distance between antennas of a transceiver, but not necessarily the same as said physical inter-antenna distance. In particular, FIG. 7a illustrates an antenna arrangement 700 configured to rotate in a plane 730 perpendicular to the transceiving direction 350, and shows the positions of the first 301 and of the second 302 directive antenna units as dots. Here, the physical distance between first and second directive antenna unit is fixed at all times. To determine effective antenna distance, which changes with rotation of the connecting element, the first axis 340 is defined as any axis perpendicular to the rotation axis. In the example of FIG. 7a, a vertical axis 720 has been drawn perpendicular to the rotation axis 330. To determine effective inter-antenna distance $d_1$, positions of the first and of the second directive antenna units are projected onto the first axis. This results in two locations 710, 720 on the first axis. The distance, measured in meters, between these two locations represent the effective antenna distance. If the connecting element 310 is rotated about the rotation axis 330, then the effective antenna distance changes, e.g., from distance $d_1$ shown on the left to distance $d_2$ shown on the right.

Figure 7B:
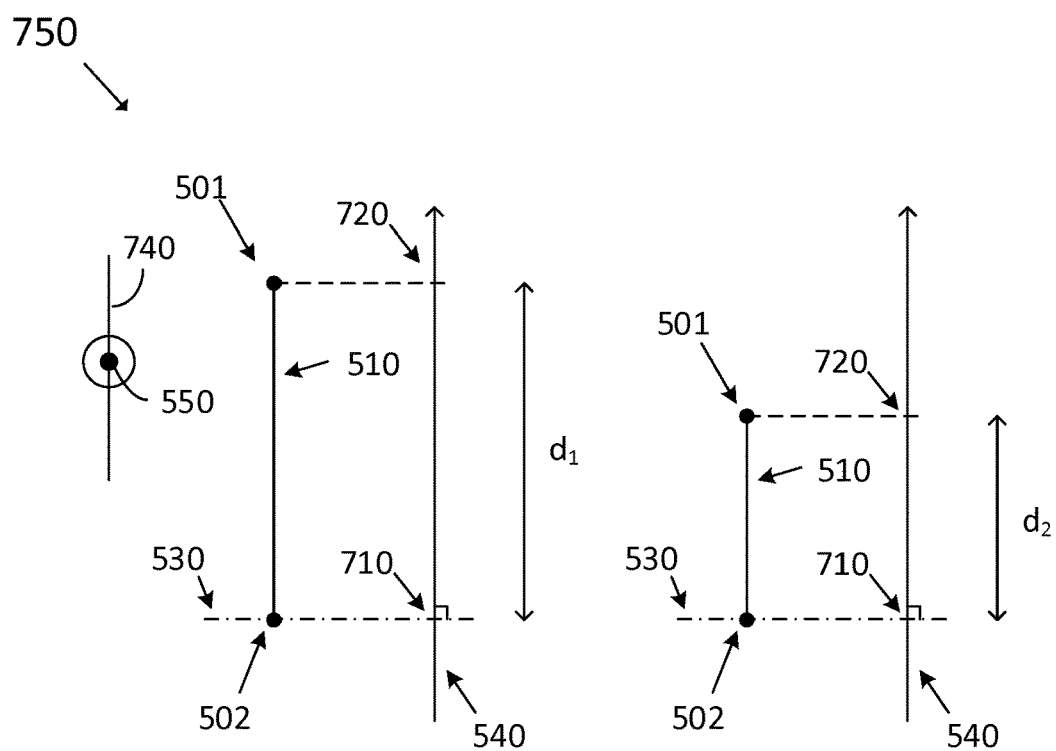

FIG. 7b illustrates the same mechanisms as FIG. 7a, but now the antenna arrangement 750 is configured for rotation in a plane 740 parallel to the transceiving direction 550. The positions of the first 501 and of the second 502 directive antenna units are again shown as dots. Again, the physical distance between first and second directive antenna unit is substantially constant at all times. To determine effective antenna distance, which changes with rotation of the connecting element, the first axis 540 is again defined as any axis perpendicular to the rotation axis 530. In the example of FIG. 7b, a horizontal axis 740 has been drawn perpendicular to the rotation axis 530. To determine effective inter-antenna distance $d_1$, positions of the first and of the second directive antenna units are projected onto the first axis. This again results in two locations 710, 720 on the first axis. The distance, measured in meters, between these two locations represent the effective antenna distance.

If the connecting element 510 is rotated about the rotation axis 530, then the effective antenna distance changes, e.g., from distance $d_1$ shown on the left to distance $d_2$ shown on the right.

It is appreciated that the absolute effective antenna distance cannot, on its own, determine whether LOS-MIMO communication will be successful or not. The geometry of the antennas on the second end of the radio link in relation to the geometry of antennas at the first end must of course also be considered. However, a change in effective antenna distance on either side of the radio link hop is guaranteed to affect the MIMO propagation channel, and in particular the condition number of the MIMO propagation channel. This means that an optimization of communication conditions is possible by adjusting effective inter-antenna distance at one end of the radio link only.

In both FIGS. 7a and 7b, the effective distance d is measured as a distance between positions of the first and the second directive antenna units projected onto a first axis 340, 540 perpendicular to the respective rotation axis 330, 530.

FIGS. 8a and 8b illustrate connecting elements 510 comprising a pantograph arrangement 800. The pantograph arrangement is configured to maintain the transceiving direction 550 of the directive antennas independently of connecting element rotation about the rotation axis.

The pantograph has one or more fixed points 801 from where two arms 802 are connected. The arms can be rotated around the fixed point/points. At rotation angle of zero degrees, shown in FIG. 8a, the two arms are running parallel from the fixed points to a further arm 803 shown in FIG. 8a as perpendicular to the two arms. One of the directive antenna units 501 is located in connection to the fixed point or points, this antenna is remains fixed in transceiving direction independently of rotation of the pantograph arrangement. The other antenna is movable and is positioned on the further arm 803, shown in FIG. 8a as located perpendicular to the two arms 802. When the connecting element, i.e., the two arms 802 are rotated about the rotation axis (not shown here), the antenna on the further arm is moving parallel with the fixed point and remains pointing in the transceiving direction. The antenna is during the rotation moving towards the fixed point where the other antenna is positioned. This movement reduces the effective inter-antenna distance between the two antennas still keeping the both antennas pointing in the same transceiving direction. FIG. 8b illustrates the antenna arrangement when a rotation of approximately 45 degrees has been applied to the connecting element. It is noted that effective inter-antenna distance $d_2$ is reduced compared to effective inter-antenna distance $d_1$, due to the rotation of the connecting element 510 about the rotation axis.

Figure 9B:
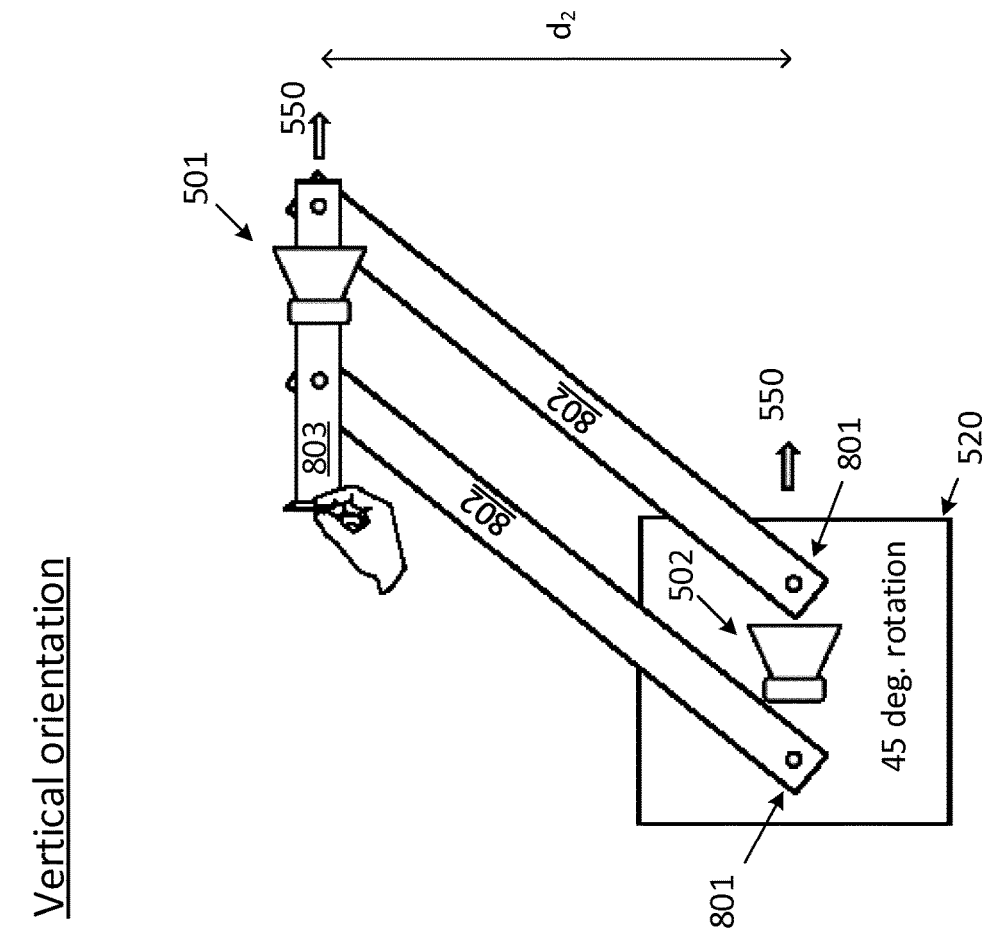
Figure 9A:
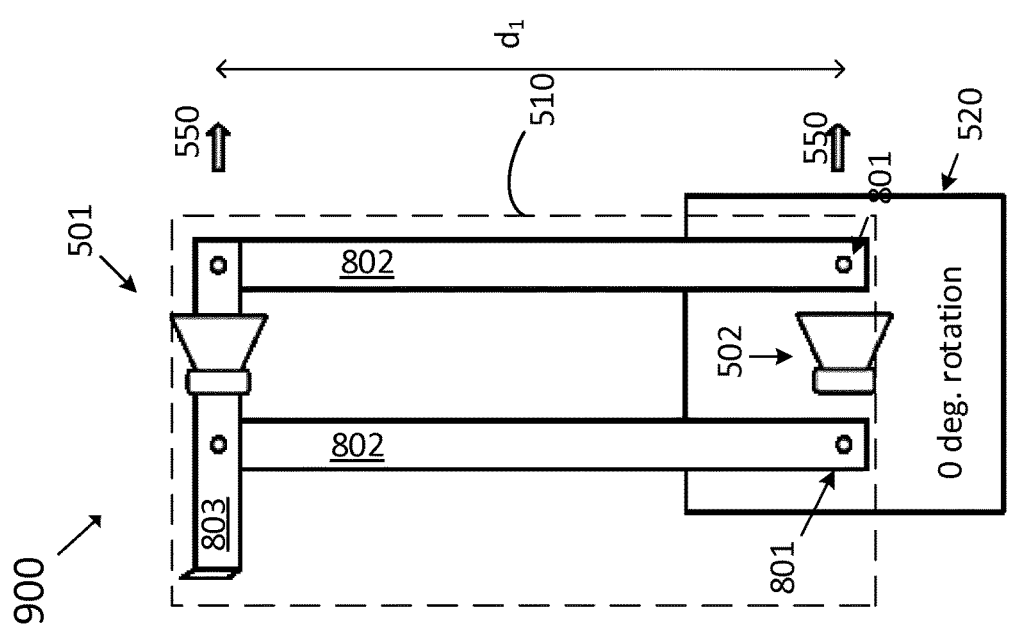

FIGS. 9a and 9b illustrate a connecting element 510 comprising a pantograph arrangement 900 arranged in a vertical orientation. The pantograph arrangement is configured to maintain the transceiving direction 550 of the directive antennas independently of connecting element rotation about the rotation axis. The configuration shown in FIG. 9a provides one effective antenna distance $d_1$. When the connecting element is rotated about the rotation axis, another effective antenna distance $d_2$ is obtained, as illustrated in FIG. 9b.

It is appreciated that the directive antenna units 501, 502 shown in FIGS. 8a, 8b, 9a, and 9b are not both directly attached to the connecting element. The first directive antenna unit 501 is attached to the connecting element 510 while the second directive antenna unit 502 is attached to the mounting bracket 520, and not directly to the connecting element.

According to aspects, additional arms are applied to the arms 802, further directive antenna units can then be attached to the pantograph arrangement.

A similar configuration is possible also for the antenna arrangements illustrated in FIGS. 3 and 4. I.e., the second directive antenna unit 302 can be arranged separately from the connecting element and attached separately to the mounting bracket, or attached to a further mounting bracket.

Hence, according to some aspects, the connecting element 310, 510 is attached to the first directive antenna unit and separated from the second directive antenna unit, the second directive antenna unit being attached to a further mounting bracket for mounting the second directive antenna unit to the fixed infrastructure.

The pantograph implementation illustrated in FIGS. 8a, 8b, 9a, and 9b, is valid for both horizontal and vertical deployment. It is possible to combine both vertical and horizontal movement at the same time and control them from one position.

Figure 10:
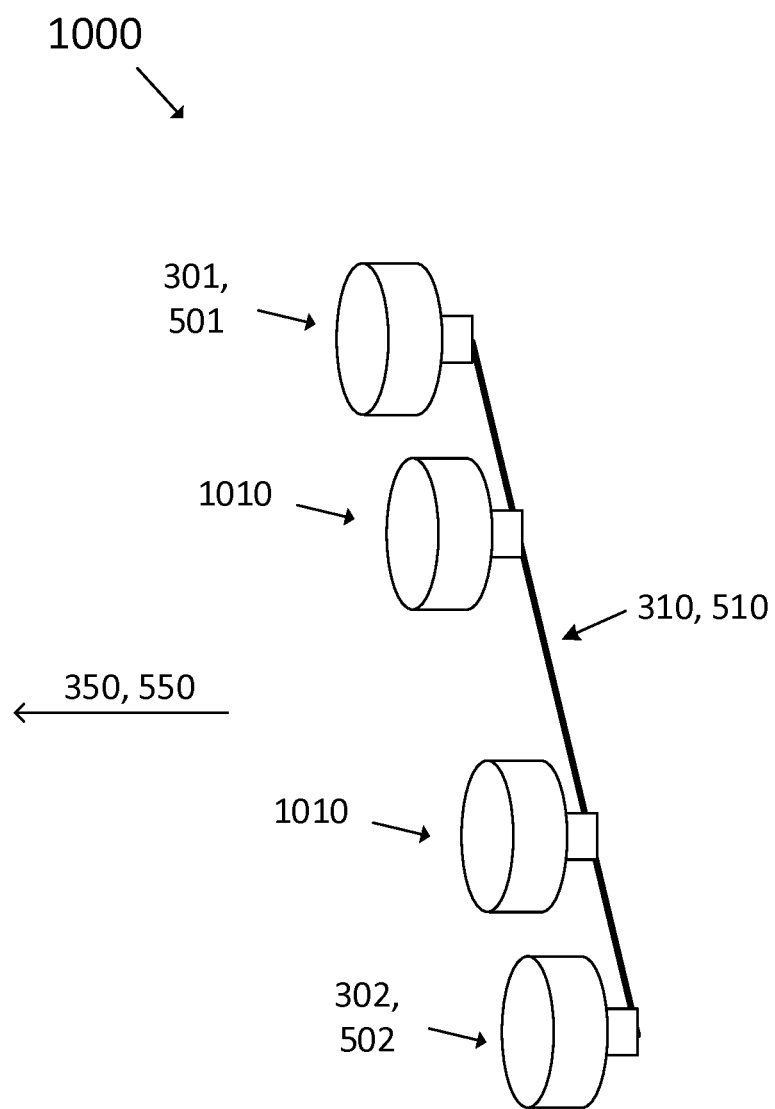

It is also possible to place a number of antennas between the two antennas, as illustrated in FIG. 10. These antennas will also maintain transceiving direction during rotation of the connecting element.

FIG. 10 illustrates an antenna arrangement 1000 which comprises more than two directive antenna units arranged on the connecting element 310, 510. The antenna arrangement 1000 thus comprises a further directive antenna unit 1010 arranged to have an antenna main lobe pointing in the transceiving direction 350, 550. The same principle as discussed above regarding effective inter-antenna distance applies also here.

Figure 11:
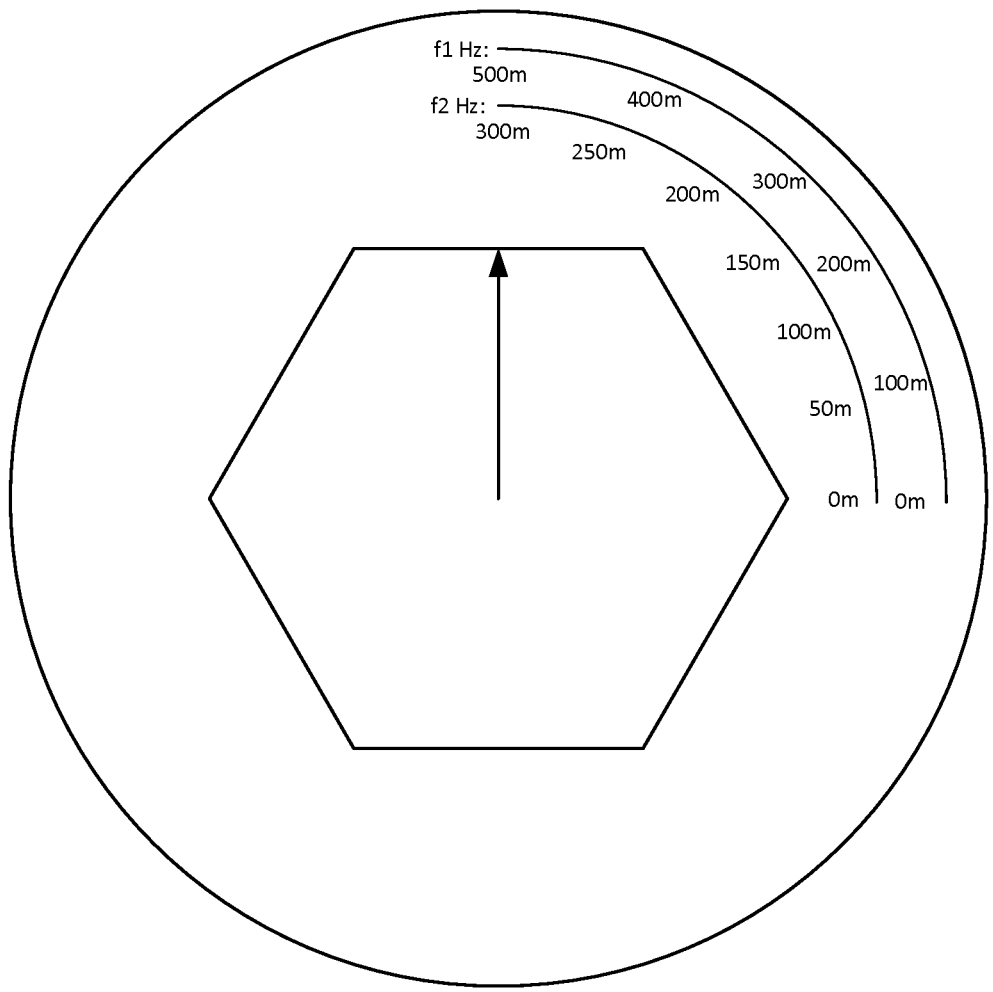

FIG. 11 illustrates a scale for use in connection to the connecting element. The scale indicates a present rotation setting of the connecting element.

Thus, according to some aspects, the antenna arrangement comprises a scale arranged to indicate a present angle of rotation of the connecting element.

According to some further aspects, the scale is arranged to indicate a preferred level of rotation as function of radio link length L and radio link carrier frequency f.

Figure 12:
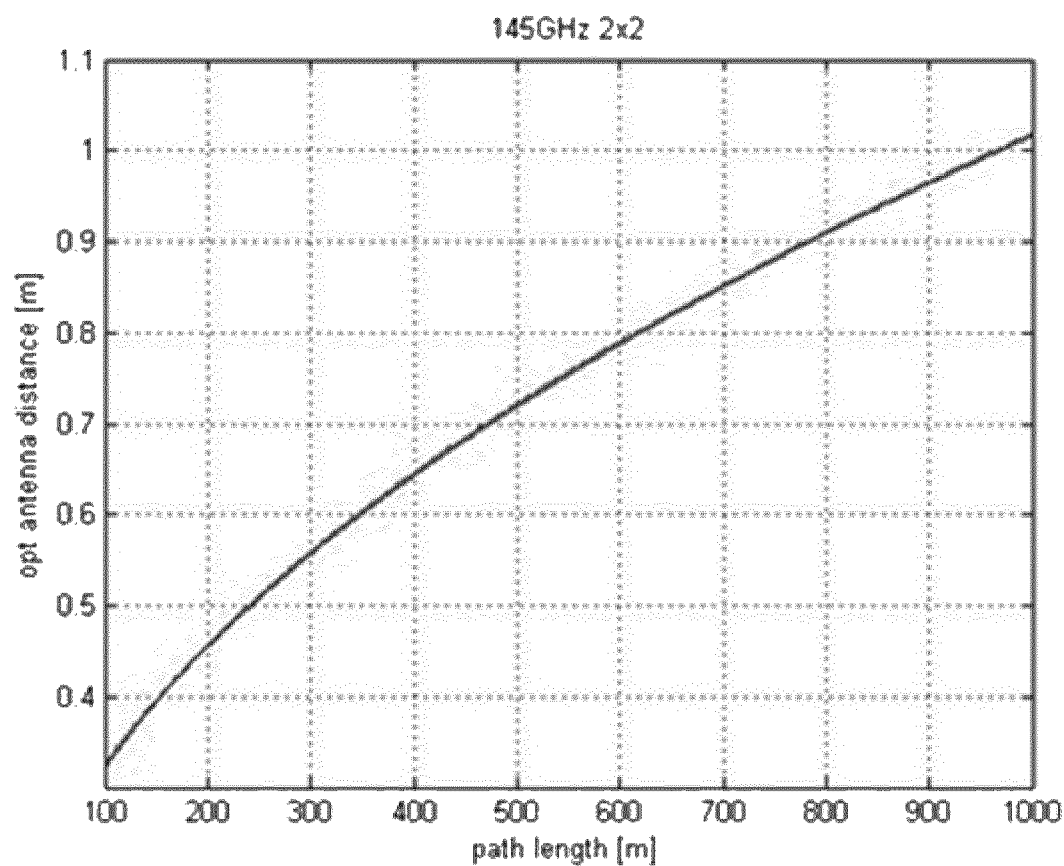
FIG. 12 is a graph showing optimal effective inter-antenna distance as function of radio link length at carrier frequency of 145 GHz.

FIG. 12 is a graph showing optimal effective inter-antenna distance as function of radio link length at carrier frequency of 145 GHz. It is noted that the optimal effective inter-antenna distance for relatively short radio distance lengths is below 1 meter. Thus, the length of the connecting element becomes manageable for the field technician.

FIG. 13 was discussed above, it illustrates a configuration of the disclosed antenna arrangement where only one of the directive antenna units is directly attached to the connecting element. The second directive antenna unit is attached to fixed infrastructure 420 by means of a separate mounting bracket 1300.

It is appreciated that combinations of the above disclosed antenna arrangements are also possible to implement. By combining an antenna arrangement having a connecting element configured to rotate in a plane perpendicular to the transceiving direction, such as the antenna arrangements discussed in connection with FIGS. 3 and 4, with an antenna arrangement having a connecting element configured to rotate in a plane parallel to the transceiving direction, such as the antenna arrangements discussed in connection with FIGS. 5 and 6, an antenna arrangement with a connecting element configured to rotate in both planes is obtained. This antenna arrangement will then have at least two rotation axes about which the connecting element can rotate.

According to some aspects, the first axis in case the antenna arrangement has more than one rotation axis is defined to be perpendicular to all rotation axes, and the effective inter-antenna distance is measured as discussed above in connection to FIGS. 7a and 7b.

According to some other aspects, the antenna arrangement has a first and a second rotation axis, the first axis is then perpendicular to the first rotation axis, and a second axis is perpendicular to the second rotation axis. First and second effective distances are then defined. The first effective distance is measured as a distance between positions of the first and the second directive antenna units projected onto the first axis perpendicular to the rotation axis. The second effective distance is measured as a distance between positions of the first and the second directive antenna units projected onto the second axis perpendicular to the rotation axis. The characteristics of the LOS-MIMO propagation channel, and in particular its condition number, is affected by changes in the first and/or in the second effective inter-antenna distance.

The rotatable antenna arrangements disclosed herein are also suitable for single-input multiple-output (SIMO) and multiple-input single output (MISO) communication systems, i.e., receive and transmit diversity systems. In such systems, it could be of interest to adjust effective inter-antenna distance to fit a particular communication scenario.

Figure 14:
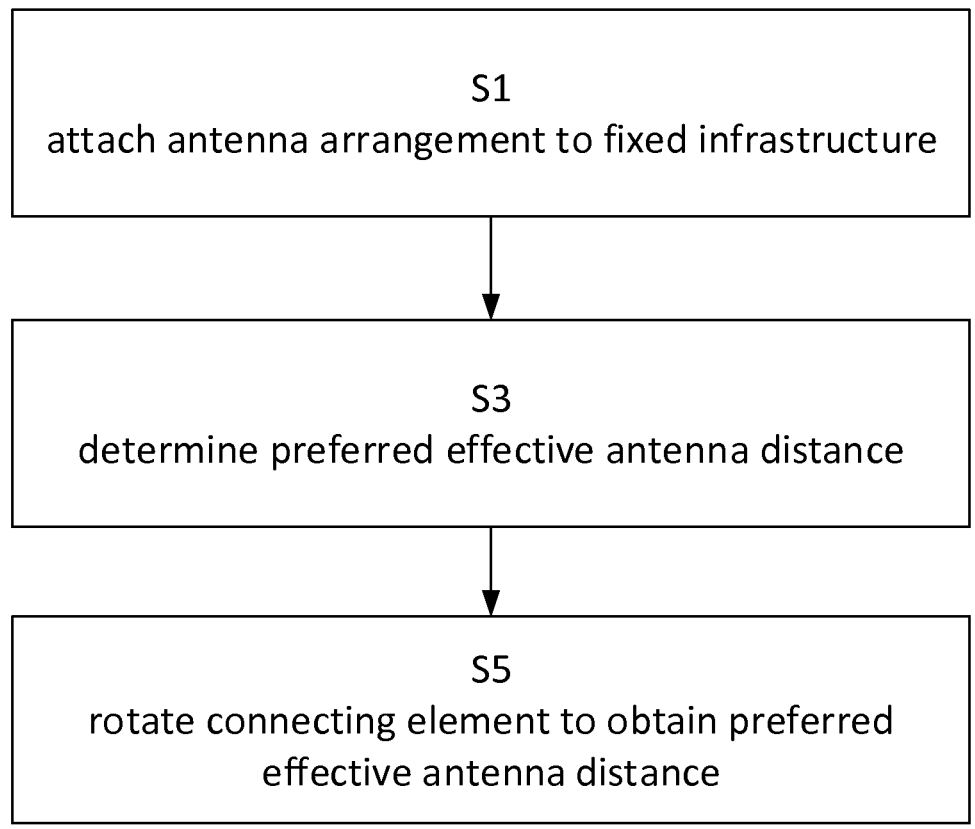
FIGS. 14-16 are flowcharts illustrating methods according to aspects of the disclosure.

FIG. 14 is a flow chart illustrating a method for deployment of an antenna arrangement according to the above disclosure. The method comprises attaching S1 the antenna arrangement to a fixed infrastructure at a near end of a planned radio link, by means of the one or more mounting brackets, determining S3 a preferred effective distance between first and second directive antennas, and rotating S5 the connecting element of the antenna arrangement to obtain the preferred effective distance between the first and the second directive antenna.

This way, a field technician can adjust effective inter-antenna distance by rotating the connecting element. The field technician does not need to move any mounting bracket during the inter-antenna distance adjustment. Thus, LOS-MIMO antenna deployment is simplified.

According to aspects, the method also comprises adjusting S7 a polarization configuration of the antenna arrangement by means of digital signal processing.

Figure 15:
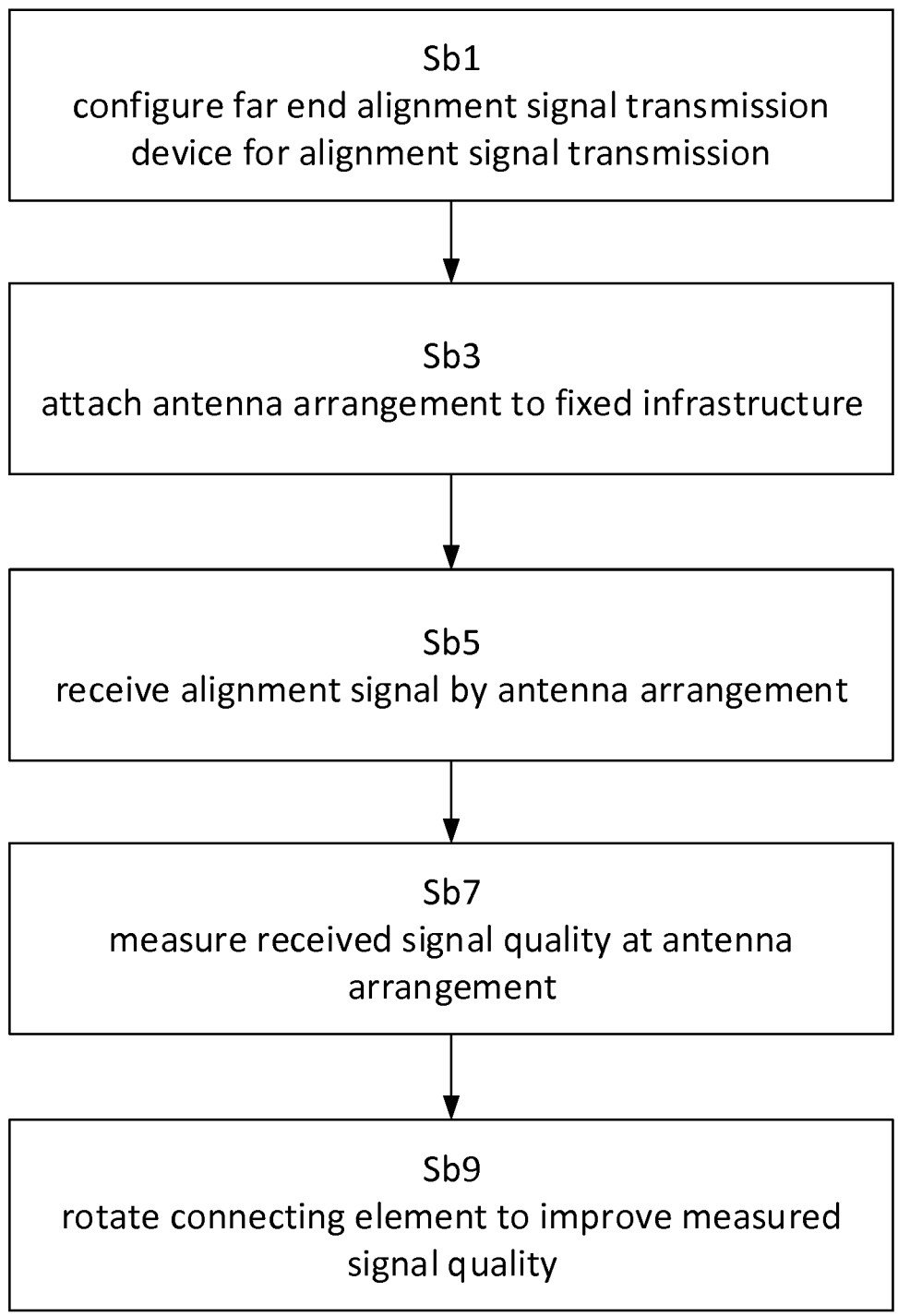

FIG. 15 is a flow chart illustrating a method for deployment of an antenna arrangement according to the above disclosure, comprising configuring Sb1 an alignment signal transmission device on a far side of a planned radio link, for transmission of an alignment signal, attaching Sb3 the antenna arrangement to a fixed infrastructure at a near end of the planned radio link, by means of the one or more mounting brackets, receiving Sb5 the alignment signal by the antenna arrangement, measuring Sb7 a signal quality of the received signal, and rotating Sb9 the connecting element of the antenna arrangement to improve the measured signal quality of the received signal.

This way, a field technician can adjust and optimize effective inter-antenna distance for LOS-MIMO communication by rotating the connecting element. The field technician does not need to move any mounting bracket during the inter-antenna distance adjustment. The Field technician does not need to determine suitable inter-antenna distances before-hand, but simply rotates the connecting element at one side of the radio link until a preferred radio link performance is obtained, e.g., in terms of received signal power. Thus, LOS-MIMO antenna deployment is simplified.

According to aspects, the method also comprises adjusting Sb11 a polarization configuration of the antenna arrangement by means of digital signal processing.

Figure 16:
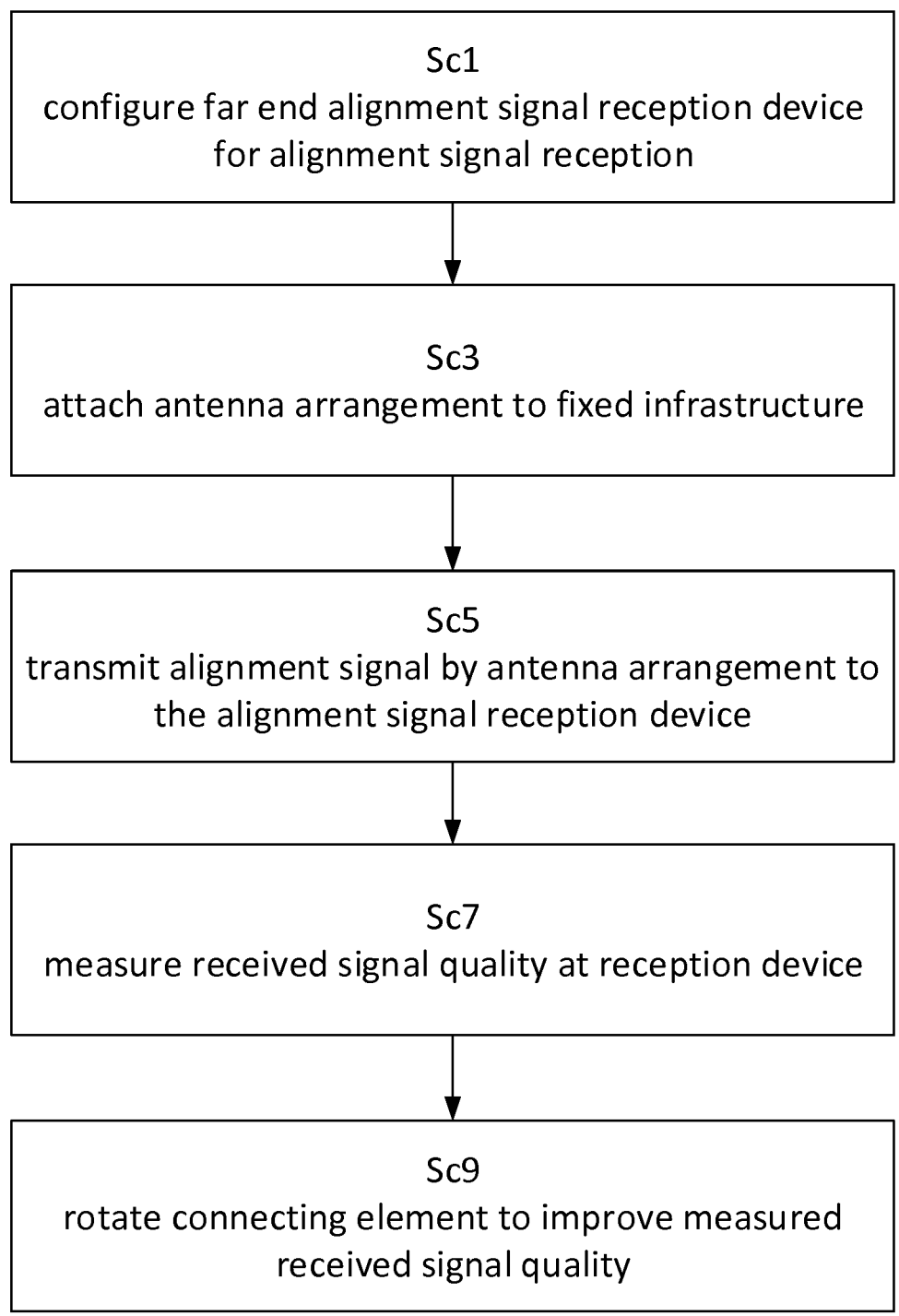

FIG. 16 is a flow chart illustrating a method for deployment of an antenna arrangement according to the above disclosure, comprising configuring Sc1 an alignment signal reception device on a far side of a planned radio link, for reception of an alignment signal, attaching Sc3 the antenna arrangement to a fixed infrastructure at a near end of the planned radio link, by means of the one or more mounting brackets, transmitting Sc5 an alignment signal by the antenna arrangement to the alignment signal reception device, measuring Sc7 a signal quality of the alignment signal received by the alignment signal reception device, and rotating Sc9 the connecting element of the antenna arrangement to improve the measured signal quality of the received signal.

According to aspects, the method also comprises adjusting Sc11 a polarization configuration of the antenna arrangement by means of digital signal processing.

The method illustrated in FIG. 16 is similar to that illustrated in FIG. 15, except that the alignment signal is transmitted to the far end device instead of from the far end device. Thus, again, a field technician can adjust and optimize effective inter-antenna distance for LOS-MIMO communication by rotating the connecting element. The field technician does not need to move any mounting bracket during the inter-antenna distance adjustment. The Field technician does not need to determine suitable inter-antenna distances before-hand, but simply rotates the connecting element at one side of the radio link until a preferred radio link performance is obtained, e.g., in terms of received signal power. Thus, LOS-MIMO antenna deployment is simplified.

The various aspects of the methods described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. An antenna arrangement configured for line-of-sight (LOS) multiple-input multiple-output (MIMO) communication, comprising:
   first and second directive antenna units arranged to have antenna main lobes pointing in a transceiving direction;
   a mounting bracket configured for mounting the antenna arrangement to a fixed infrastructure; and
   a connecting element attached to at least one of the directive antenna units and arranged to separate the directive antenna units by a distance, the connecting element being rotatably arranged in relation to the mounting bracket and arranged to rotate about a rotation axis to control an effective antenna distance between the first and second directive antenna units, wherein control of the effective antenna distance is based on each angle of rotation about the rotation axis that results in a corresponding effective antenna distance between the first and second directive antenna units while maintaining a substantially fixed transceiving direction of the antenna arrangement independently of rotation of the connecting element about the rotation axis.

2. The antenna arrangement according to claim 1, wherein the connecting element is arranged to rotate about the rotation axis in a plane perpendicular to the transceiving direction.

3. The antenna arrangement according to claim 1, wherein the connecting element is directly attached to the mounting bracket, and where the rotation axis passes through the mounting bracket.

4. The antenna arrangement according to claim 1, wherein the connecting element is arranged to rotate about the rotation axis in a plane parallel to the transceiving direction.

5. The antenna arrangement according to claim 1, wherein the connecting element comprises a pantograph arrangement, the pantograph arrangement being configured to maintain the transceiving direction of the directive antennas independently of connecting element rotation about the rotation axis.

6. The antenna arrangement according to claim 1, wherein the connecting element is attached to first and second directive antenna unit.

7. The antenna arrangement according to claim 1, wherein the connecting element is attached to the first directive antenna unit and separated from the second directive antenna unit, the second directive antenna unit being attached to a further mounting bracket for mounting the second directive antenna unit to the fixed infrastructure.

8. The antenna arrangement according to claim 1, comprising one or more further directive antenna units arranged to have antenna main lobes pointing in the transceiving direction.

9. The antenna arrangement according to claim 1, comprising a scale arranged to indicate a present angle of rotation of the connecting element.

10. The antenna arrangement according to claim 1, wherein the scale is arranged to indicate a preferred level of rotation as function of radio link length L and radio link carrier frequency f.

11. The antenna arrangement according to claim 1, comprising a dome arranged to enclose the directive antennas and the connecting element.

12. The antenna arrangement according to claim 1, wherein the connecting element is configured to be manually rotated about the rotation axis.

13. The antenna arrangement according to claim 1, wherein the connecting element is configured to be automatically rotated about the rotation axis in response to an input control signal.

14. The antenna arrangement according to claim 1, comprising a locking mechanism having an open and a closed position, the locking mechanism being arranged to allow rotation of the connecting element when in the open position, and to prevent rotation of the connecting element when in the closed position.

15. The antenna arrangement according to claim 1, wherein each effective antenna distance is defined by a projected distance measured between a projection of each of the first and second directive antenna units on an axis that is perpendicular to the rotation axis.

16. A method for deployment of an antenna arrangement, the method comprising:

providing an antenna arrangement comprising first and second directive antenna units arranged to have antenna main lobes pointing in a transceiving direction, a mounting bracket configured for mounting the antenna arrangement to a fixed infrastructure, and a connecting element attached to at least one of the directive antenna units and arranged to separate the directive antenna units by a distance, the connecting element being rotatably arranged in relation to the mounting bracket and arranged to rotate about a rotation axis to control an effective antenna distance between the first and second directive antenna units, wherein control of the effective antenna distance is based on each angle of rotation about the rotation axis that results in a corresponding effective antenna distance between the first and second directive antenna units while maintaining a substantially fixed transceiving direction of the antenna arrangement independently of rotation of the connecting element about the rotation axis;

attaching the antenna arrangement to a fixed infrastructure at a near end of a planned radio link, by means of the one or more mounting brackets;

determining a preferred effective distance between first and second directive antennas; and rotating the connecting element of the antenna arrangement to obtain the preferred effective distance between the first and the second directive antenna.

17. The method according to claim 16, wherein each effective antenna distance is defined by a projected distance measured between a projection of each of the first and second directive antenna units on an axis that is perpendicular to the rotation axis.

18. A method for deployment of an antenna arrangement, the method comprising:

providing an antenna arrangement comprising first and second directive antenna units arranged to have antenna main lobes pointing in a transceiving direction, a mounting bracket configured for mounting the antenna arrangement to a fixed infrastructure, and a connecting element attached to at least one of the directive antenna units and arranged to separate the directive antenna units by a distance, the connecting element being rotatably arranged in relation to the mounting bracket and arranged to rotate about a rotation axis to control an effective antenna distance between the first and second directive antenna units, wherein control of the effective antenna distance is based on each angle of rotation about the rotation axis that results in a corresponding effective antenna distance between the first and second directive antenna units while maintaining a substantially fixed transceiving direction of the antenna arrangement independently of rotation of the connecting element about the rotation axis;

configuring an alignment signal transmission device on a far side of a planned radio link, for transmission of an alignment signal;

attaching the antenna arrangement to a fixed infrastructure at a near end of the planned radio link, by means of the one or more mounting brackets;

receiving the alignment signal by the antenna arrangement;

measuring a signal quality of the received signal; and rotating the connecting element of the antenna arrangement to improve the measured signal quality of the received signal.

19. A method for deployment of an antenna arrangement, the method comprising:

providing an antenna arrangement comprising first and second directive antenna units arranged to have antenna main lobes pointing in a transceiving direction, a mounting bracket configured for mounting the antenna arrangement to a fixed infrastructure, and a connecting element attached to at least one of the directive antenna units and arranged to separate the directive antenna units by a distance, the connecting element being rotatably arranged in relation to the mounting bracket and arranged to rotate about a rotation axis to control an effective antenna distance between the first and second directive antenna units, wherein control of the effective antenna distance is based on each angle of rotation about the rotation axis that results in a corresponding effective antenna distance between the first and second directive antenna units while maintaining a substantially fixed transceiving direction of the antenna arrangement independently of rotation of the connecting element about the rotation axis;

configuring an alignment signal reception device on a far side of a planned radio link, for reception of an alignment signal;

attaching the antenna arrangement to a fixed infrastructure at a near end of the planned radio link, by means of the one or more mounting brackets;

transmitting an alignment signal by the antenna arrangement to the alignment signal reception device;

measuring a signal quality of the alignment signal received by the alignment signal reception device; and rotating the connecting element of the antenna arrangement to improve the measured signal quality of the received signal.

20. The method according to claim 19, wherein each effective antenna distance is defined by a projected distance measured between a projection of each of the first and second directive antenna units on an axis that is perpendicular to the rotation axis.

* * * * *